MIXED EXTRACTIVE SOLVENT IS 10-90 WT. % SOLVENT A AND THE BALANCE IS SOLVENT B

SOLVENT A IS 1,3-BUTYLENE GLYCOL, 1,4-BUTYLENE GLYCOL, ISOBUTYLENE GLYCOL, GLYCERINE OR MIXTURES THEREOF

SOLVENT B IS DIOXANE, BUTYL ACETATE, 2-ETHYLHEXANOL OR MIXTURES THEREOF

United States Patent Office 3,838,020
Patented Sept. 24, 1974

3,838,020
PROCESS FOR PURIFYING ALKYLENE OXIDES BY EXTRACTIVE DISTILLATION WITH A PLURAL SOLVENT MIXTURE
Osamu Kageyama, Manabu Kai, and Hirosi Yokoo, Ohimachi, Saitama, Japan, assignors to Daicel Ltd., Osaka, Japan
Filed Nov. 28, 1972, Ser. No. 310,089
Claims priority, application Japan, Dec. 3, 1971, 46/97,682
Int. Cl. B01d 3/40; C07d 1/08
U.S. Cl. 203—56                 9 Claims

ABSTRACT OF THE DISCLOSURE

Alkylene oxides having from 3 to 5 carbon atoms are purified by subjecting same to extractive distillation using at least one solvent (A) selected from the group consisting of 1,3-butylene glycol, 1,4-butylene glycol, isobutylene glycol and glycerine and at least one solvent (B) selected from the group consisting of dioxane, butyl acetate and 2-ethylhexanol.

BACKGROUND OF THE INVENTION

Field of the invention

The present invention relates to a purification process for obtaining an alkylene oxide of high purity. More particularly, this invention relates to a process for obtaining an alkylene oxide having from 3 to 5 carbon atoms and of high purity and quality, by subjecting the crude alkylene oxide, which cannot be purified easily by conventional distillation processes, to extractive distillation with suitable solvents.

DESCRIPTION OF THE PRIOR ART

Alkylene oxides are generally prepared by direct oxidation of starting olefins with oxygen or oxidation of the olefins with an oxidizing agent such as hydrogen peroxide or peracetic acid, or by the halohydrin method in which alkylene oxides are prepared via olefin chlorohydrins. The alkylene oxides thus prepared are useful as starting compounds of polymerizable monomers, but they must be in highly pure form for this purpose.

Alkylene oxides obtained by direct oxidation or by oxidation with an oxidizing agent contain impurities including water and organic compounds such as aldehydes, ketones, esters, alcohols and organic acids having the same or nearly the same number of carbon atoms as those of the alkylene oxides. Those organic impurities have been removed heretofore by distillation (including extractive distillation) or chemical treatments, for example, by hydrolysis of esters and neutralization of acids with an alkali solution followed by distillation purification.

Water has been removed heretofore by using a drying agent such as a molecular sieve prior to the distillation purification. Purification by means of distillation alone is difficult, because the impurities in the oxides include those having boiling points close to those of the desired alkylene oxides and an azeotropic mixture is formed. Even if purification by distillation alone is possible, in many cases, complicated steps are required or numerous stages of distillation are required even if the steps are simple. In the case of, for example, propylene oxide used as a starting compound for a polymerizable monomer, a rectification tower of more than 120 stages has been necessary. In the case of isobutylene oxide, an azeotropic mixture with water (2% by weight of water) is formed, and purification by means of mere distillation is impossible. If alkylene oxides are subjected to a chemical treatment or a treatment with, for example, a drying agent prior to or during the distillation, the yield of the product is reduced. Such a method is considerably troublesome from an industrial viewpoint.

SUMMARY OF THE INVENTION

Figure 1:
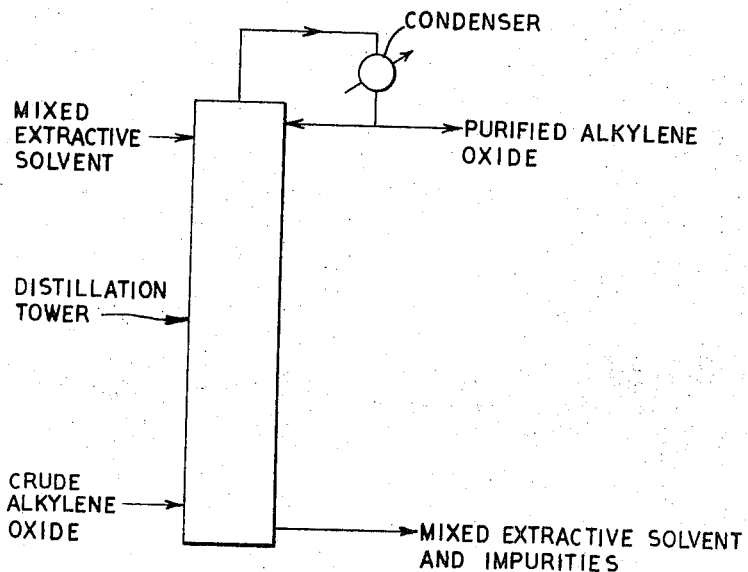
FIG. 1 is a schematic illustration of one embodiment of the invention.
Figure 2:
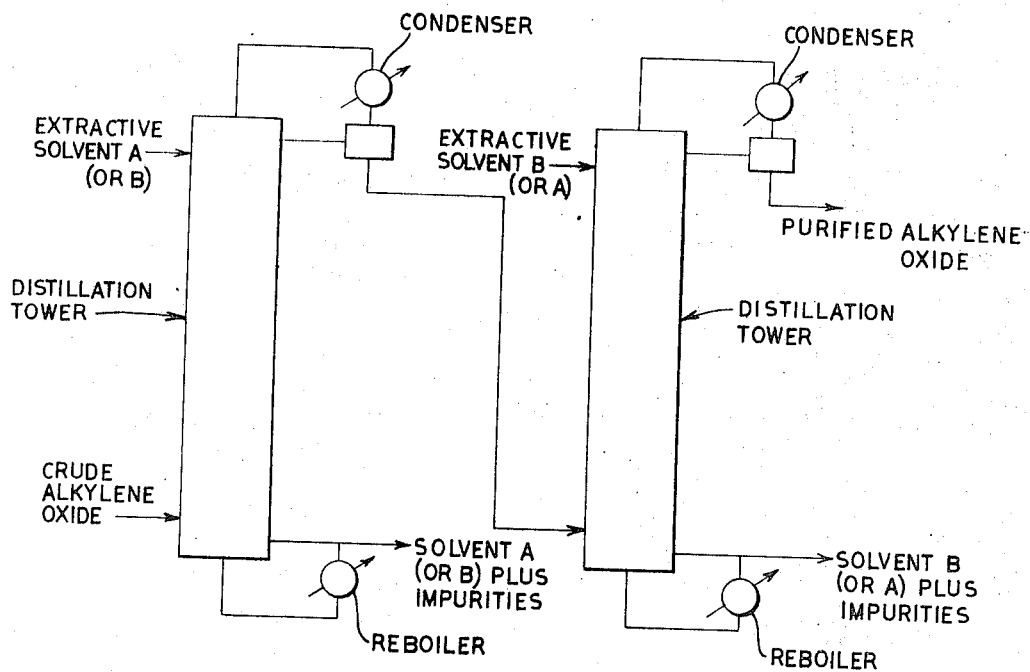
FIG. 2 is a schematic illustration of another embodiment of the invention.

The present invention has as its purpose the elimination of the aforementioned faults by removing impurities such as esters, alcohols, aldehydes, ketones, organic acids and water contained in the oxides by extractive distillation with suitable solvents in novel combination. In general, it is relatively difficult to remove water and impurities from organic compounds by extractive distillation with a single solvent. Thus, when a single solvent is used, either water or the organic compounds are removed. According to the present invention, this disadvantage is eliminated by carrying out extractive distillation with a novel combination of two kinds of solvents. The present invention relates to a process for purifying a crude alkylene oxide having from 3 to 5 carbon atoms characterized in that the alkylene oxide is subjected to extractive distillation by using (A) at least one solvent selected from the group consisting of 1,3-butylene glycol, 1,4-butylene glycol, isobutylene glycol, glycerine and mixtures thereof, and (B) at least one solvent selected from the group consisting of dioxane, butyl acetate, 2-ethylhexanol and mixtures thereof. Among the solvents for the extractive distillation used in the present invention, solvents effective for removing water due to a high compatibility thereof with water are 1,3-butylene glycol, 1,4-butylene glycol, isobutylene glycol and glycerine and solvents effective for removing organic compounds (such as esters, alcohols, aldehydes and ketones) due to a high compatibility thereof with the organic compounds are butyl acetate, 2-ethylhexanol and dioxane.

For the purposes of this specification and claims the term "crude alkylene oxide" refers to an alkylene oxide having a content of total impurities of about 0.02 to 5.0% by weight. This includes those alkylene oxides which have been given a conventional distillation pretreatment.

In the process of the present invention, water and the organic compounds can be removed at the same time by using a mixed solvent comprising those two kinds of solvents in a suitable proportion, or alternatively the impurities may be removed stepwise by using said two kinds of solvents one after the other. The weight ratio of solvent A to solvent B will depend on the weight ratio of water to organic impurities in the crude alkylene oxide and the compatibilities of the respective solvents therewith. The amount of solvent A can be selected appropriately within the range of from about .10 to 90% by weight of the total weight of solvent A plus solvent B. For example, in the purification of propylene oxide and isobutylene oxide, a mixed solvent consisting essentially of 20–40 wt. percent of butyl acetate and 60–80 wt. percent of 1,3-butylene glycol, or 50–80 wt. percent of 1,3-butylene glycol and 20–50 wt. percent of dioxane is effective.

The purification can be effected according to conventional means of extractive distillation. For example, the mixed solvent can be fed continuously into a distillation tower through an inlet near the top of the tower and a crude alkylene oxide to be purified is fed continuously therein through an inlet near the bottom thereof to distill out the purified product from the top of the tower and to discharge the mixed solvents and the impurities in the crude alkylene oxide as distillation residue. If the difference between the distillation temperature and the temperature of the impurities is large owing to the kind of solvents used, a part of the impurities must be taken out as a side stream through an outlet near the bottom of the tower. The mixture of the solvents and impurities taken out as residue is further separated in a simple distillation tower to recover the solvents for reuse.

The purification in two steps using the two respective solvents separately as described above, without using mixed solvent, is carried out as follows. Namely, two distillation towers are used. In the first tower, organic impurities are removed by extractive distillation with solvent B compatible with the impurities, then the top distillate is charged in the next tower through an inlet at the bottom and solvent A compatible with water is fed into the tower through an inlet near the top to distill out the final, purified product from the top of the second tower. This order of steps can be reversed.

The weight ratio of total solvents to crude alkylene oxide used in either of the foregoing two types of distillation, i.e., mixed solvents A and B or successive use of A and B (or B and A) can be in the range of 3–20:1.

Thus, highly pure alkylene oxides which can be used as starting compounds of polymerization processes can be obtained according to the process of the present invention.

The present invention will be described by way of the following illustrative Examples. In the Examples, all percentages are percent by weight.

Example 1

Propylene oxide (impurities; 0.05% methyl formate, 0.3% methyl acetate, 0.3% methanol, 0.7% water and 0.1% acetone), from which the greater part of the impurities present in the propylene oxide reaction mixture had been removed by usual distillation pretreatment, was purified by a two step purification using in the first step 2-ethylhexanol as solvent in a 50-stage distillation tower. 2-Ethylhexanol was fed continuously into the 48th stage near the top of the tower and propylene oxide to be purified was fed continuously into the 10th stage near the bottom of the tower. The organic impurities were removed from the still bottom, while a part of the impurities was removed as a side stream from the 5th stage near the bottom of the tower. Then, the top distillate was fed continuously into the 10th stage near the bottom of the next tower and glycerine was fed continuously into the 48th stage near the top of the next tower. The weight ratio of the solvent to propylene oxide to be purified was 5 and the reflux ratio was 3, in both towers. Thus purified product comprised 99.98% of propylene oxide and 0.02% of water.

Example 2

Isopropylene oxide (impurities; the same as in Example 1), from which the greater part of the impurities had been removed by usual distillation pretreatment, was purified in two 50-stage distillation towers in the same manner as in Example 1. 2-Ethylhexanol was used as a first solvent for separating hydrocarbon compounds and isobutylene glycol was used for separating water. The weight ratio of the solvent to isopropylene oxide charged was 7 and reflux ratio was 3 in both towers. Thus purified product comprised 99.97% of isobutylene oxide and 0.03% of water.

Example 3

Propylene oxide (impurities; the same as in Example 1), from which the greater part of the impurities had been removed by usual distillation pretreatment, was purified in a 50-stage distillation tower by using a mixed solvent consisting of 25% of butyl acetate and 75% of 1,3-butylene glycol. The mixed solvent was fed into the 48th stage near the top of the tower. Propylene oxide to be purified was fed into the 8th stage near the bottom of the tower. The weight ratio of the mixed solvent to propylene oxide charged was 4:1 and the reflux ratio was 3. A part of the impurities was distilled out as a side stream from the 5th stage near the bottom of the tower. The product purified by the continuous extractive distillation comprised 99.98% of propylene oxide and 0.02% of water.

Example 4

Continuous extractive distillation of the same starting material as in Example 1 was effected in the same manner as in Example 3 by using a mixed solvent comprising 20% of 2-ethylhexanol and 80% of 1,4-butylene glycol. Thus purified product comprised 99.97% of propylene oxide and 0.03% of water.

Example 5

Isobutylene oxide (impurities; 0.3% methyl acetate, 0.4% acetone, 0.03% isobutyl aldehyde and 0.5% water), from which the greater part of the impurities had been removed by usual distillation pretreatment, was purified in a 60-stage distillation tower with a mixed solvent consisting of 30% of butyl acetate and 70% of 1,3-butylene glycol. The mixed solvent was charged in the 58th stage near the top of the tower and isobutylene oxide to be purified was charged in the 8th stage near the bottom of the tower. A part of the impurities was distilled out as a side stream from the 5th stage near the bottom of the tower. The weight ratio of the solvent to isobutylene oxide to be purified was 5:1. Both solvent and isobutylene oxide were fed continuously. After the extractive distillation, the purified product comprised 99.93% of isobutylene oxide, 0.04% of water and 0.03% of methyl acetate.

Example 6

Continuous extractive distillation of isobutylene oxide was effected in the same manner as in Example 5 by using a mixed solvent comprising 20% of 2-ethylhexanol and 80% of 1,3-butylene glycol. Thus purified product comprised 99.93% of isobutylene oxide, 0.04% of water and 0.03% of methyl acetate.

Example 7

Isobutylene oxide was purified by extractive distillation with a mixed solvent comprising 25% of 2-ethylhexanol and 75% of glycerine in the same manner as in Example 5. Thus purified product comprised 99.90% of isobutylene oxide, 0.06% of water and 0.04% of methyl acetate.

Example 8

Isobutylene oxide was purified by extractive distillation with a mixed solvent comprising 30% of butyl acetate and 70% of isobutylene glycol in the same manner as in Eaxmple 5. Thus purified product comprised 99.95% of isobutylene oxide, 0.02% of water and 0.01% of acetone.

Example 9

Isobutylene oxide was purified by extractive distillation with a mixed solvent comprising 30 wt. percent of dioxane and 70 wt. percent of 1,3-butylene glycol in the same manner as in Example 5. Thus purified product comprises 99.93% of isobutylene oxide, 0.01% of methyl acetate, 0.02% of acetone and 0.04% of water.

Comparative Example 1

Continuous extractive distillation of isobutylene oxide was effected in the same manner as in Example 5 by using a mixed solvent comprising 70% of iso-propanol and 30% ethyl acetate, but the distilled product comprised 98% of isobutylene oxide, 0.45% of water, 0.3% of methyl acetate, 0.37% of acetone and 0.88% of ethyl acetate.

Comparative Example 2

Continuous extractive distillation of isobutylene oxide was effected in the same manner as in Example 5 by using a mixed solvent comprising 40% of n-propanol and 60% of n-butanol, but the distilled product comprised 98.34% of isobutylene oxide, 0.28% of methyl acetate, 0.40% of acetone and 0.48% of water.

These comparative examples show that a combination of a solvent effective for removing water due to a high compatibility thereof with water (such as iso-propanol and n-propanol) and a solvent effective for removing organic compounds due to a high compatibility thereof with the organic compounds (such as ethyl acetate and n-butanol), whch does not belong to the particular combination of solvents according to the present invention, is not effective for removing impurities contained in the oxides.

The embodiments of the invention in which an exclusive property or privilege is claimed are defined as follows:

1. A process for purifying an alkylene oxide having from 3 to 5 carbon atoms, which comprises subjecting crude alkylene oxide to extractive distillation using at least one solvent (A) selected from the group consisting of 1,3-butylene glycol, 1,4-butylene glycol, isobutylene glycol and glycerine and at least one solvent (B) selected from the group consisting of dioxane, butyl acetate and 2-ethylhexanol, and recovering said purified alkylene oxide as distillate.

2. The process of Claim 1, wherein the weight ratio of total solvents (A+B) to said crude alkylene oxide is 3–20:1.

3. The process of Claim 2, in which the solvent (A) is from about 10 to 90 percent by weight of total solvents.

4. The process of Claim 3 for the purification of crude propylene oxide containing from 0.02 to 5.0 percent impurities comprising water and organic impurities which comprise extractively distilling said crude propylene oxide with solvent (A) and solvent (B), and recovering purified propylene oxide as distillate.

5. The process of Claim 3 for the purification of crude isopropylene oxide containing from 0.02 to 5.0 percent impurities comprising water and organic impurities which comprise extractively distilling said crude isopropylene oxide with solvent (A) and solvent (B), and recovering purified isopropylene oxide as distillate.

6. The process of Claim 3 for the purification of crude isobutylene oxide containing from 0.02 to 5.0 percent impurities comprising water and organic impurities which comprise extractively distilling said crude isobutylene oxide with solvent (A) and solvent (B), and recovering purified isobutylene oxide as distillate.

7. The process of Claim 1, in which the extractive distillation is carried out using the said solvents (A) and (B) separately in successive distillation towers.

8. The process of Claim 1, in which the extractive distillation is carried out using the said solvents (A) and (B) in admixture.

9. The process of Claim 2, in which the weight ratio of solvent (A) to solvent (B) is 50–80:50–20.

References Cited
UNITED STATES PATENTS

| | | | |
|---|---|---|---|
| 3,578,568 | 5/1971 | Washall | 203—64 |
| 3,715,284 | 2/1973 | Burns et al. | 203—56 |
| 3,632,482 | 1/1972 | Hoory | 203—63 |

WILBUR L. BASCOMB, Jr., Primary Examiner

U.S. Cl. X.R.

203—60, 63, 58, 64; 260—348.5 L